United States Patent [19]

Southward

[11] Patent Number: 4,941,702

[45] Date of Patent: Jul. 17, 1990

[54] UNDERSEAT EXPANSION BED VEHICLE FOR TRANSPORTING LONG LOAD MATERIAL

[76] Inventor: James F. Southward, 1360 5th Ave., Belmont, Calif. 94002

[21] Appl. No.: 314,032

[22] Filed: Feb. 23, 1989

[51] Int. Cl.⁵ .............................................. B62D 25/00
[52] U.S. Cl. ................................ 296/37.6; 296/37.15; 296/190
[58] Field of Search ................... 296/37.6, 37.15, 24.1, 296/190

[56] References Cited

U.S. PATENT DOCUMENTS 4,659,137  4/1987  Chassaing et al. ................. 296/190
4,738,480  4/1988  Ward ................................. 296/37.6

FOREIGN PATENT DOCUMENTS 10995     5/1980  European Pat. Off. ......... 296/37.15
1092316  11/1960  Fed. Rep. of Germany ..... 296/37.6

Primary Examiner—Robert R. Song
Attorney, Agent, or Firm—Paul Hentzel

[57] ABSTRACT

A load vehicle such as pick up truck or van has a rear load section with an initial load bed and an expansion bed channel extending under the seats of the cab or personnel section. Long loads and especially panel type sheets which are longer than the initial bed may be pushed forward into the expansion bed channel within the personnel section. In multi-seat vans the expansion channel is sequentially formed from back to front by the space under the rear seat, and then by the foot space in front of the rear seat, and then by the space under the middle seat, etc. Each space is a separate expansion bed area with a barrier at the forward end thereof for retaining in position and preventing the load from entering the next forward expansion area. Slide tracks or rollers may be provided to facilitate pushing the load forward into the expansion channel as the vehicle is loaded.

23 Claims, 5 Drawing Sheets

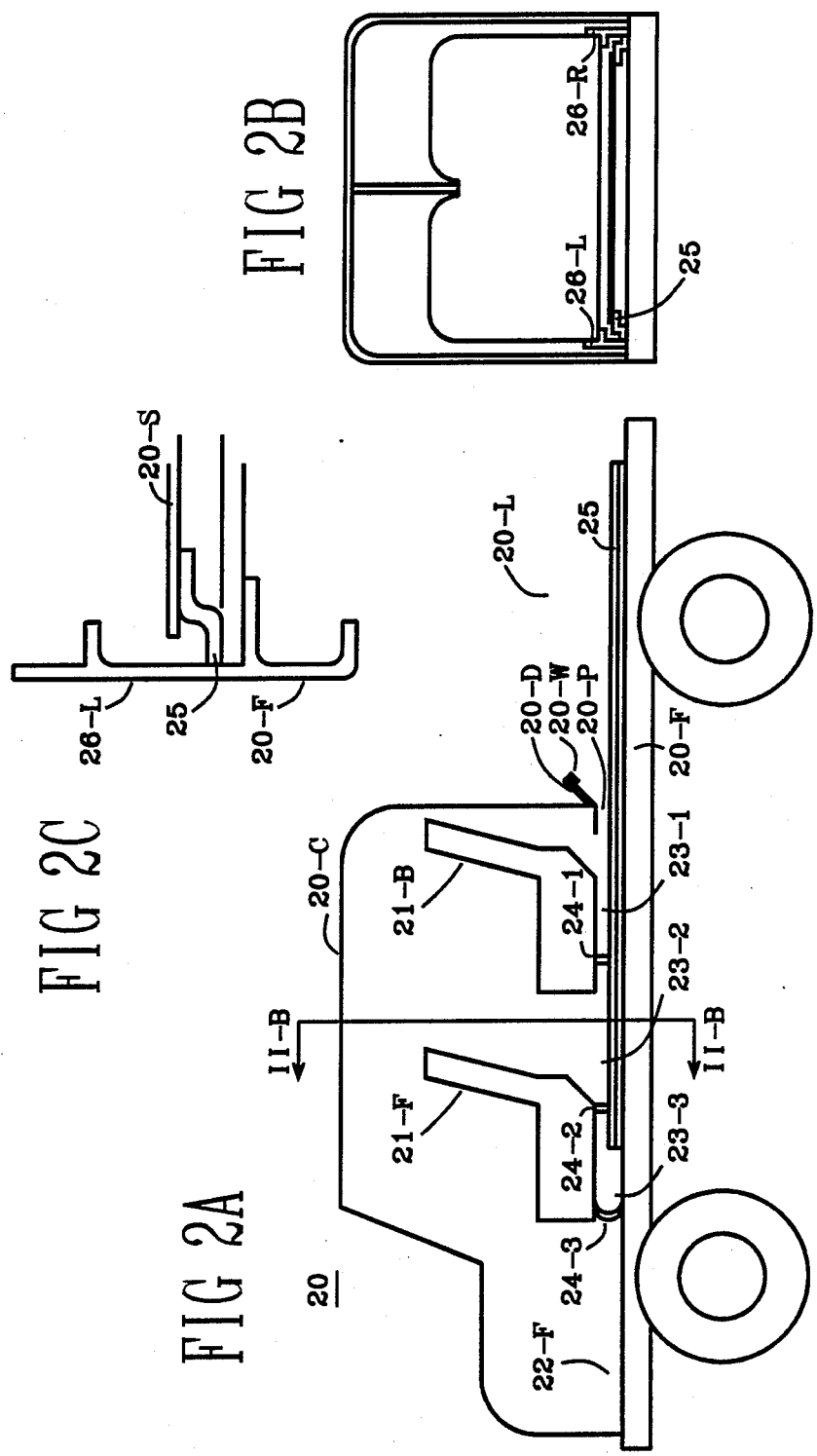

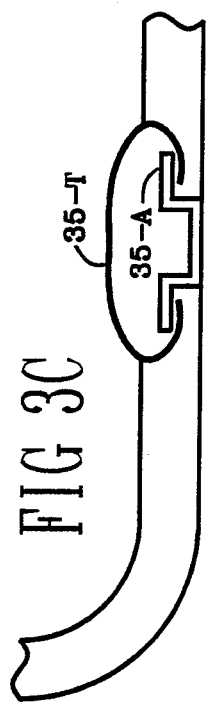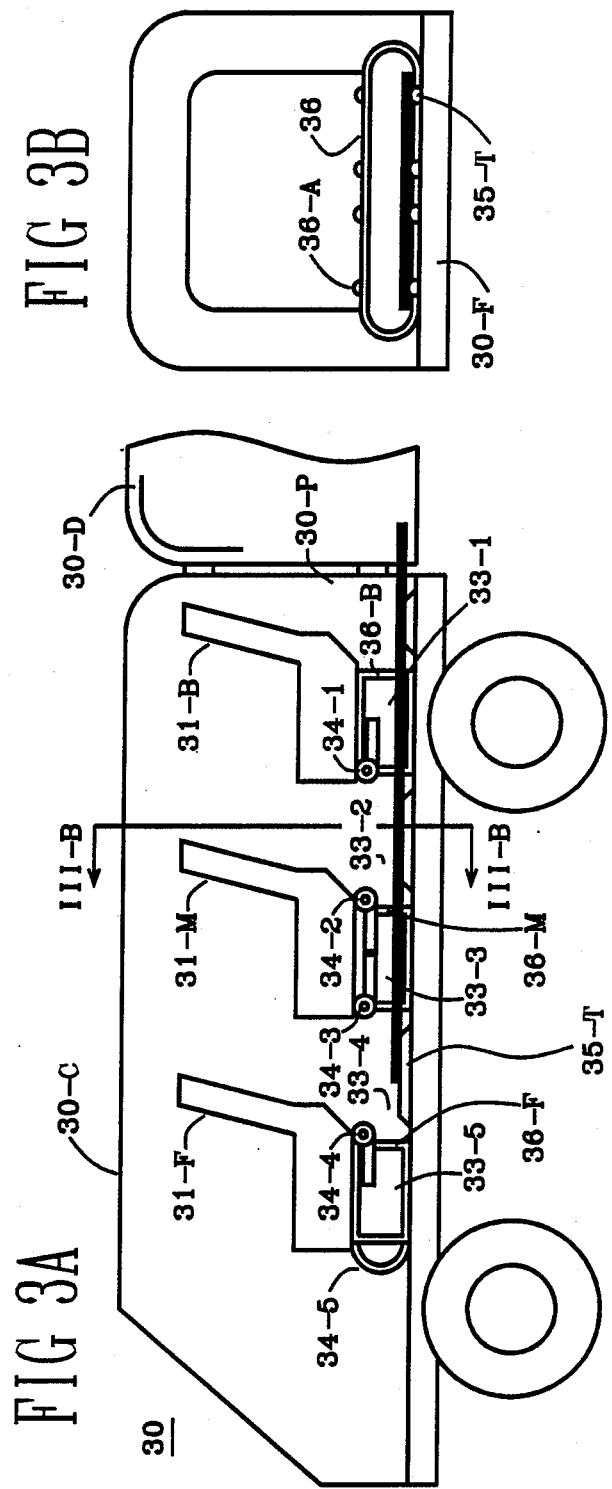

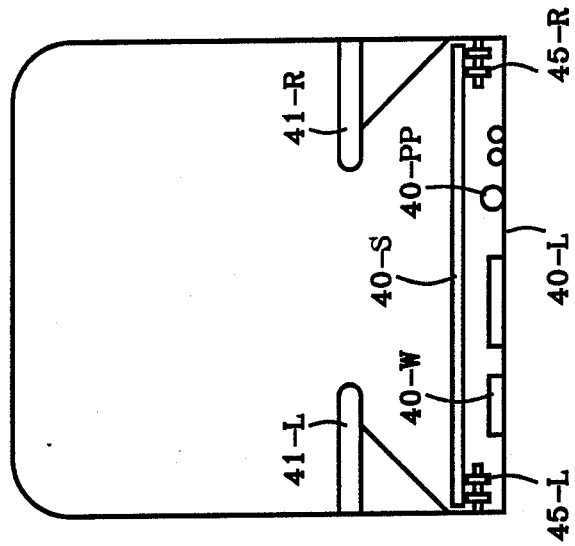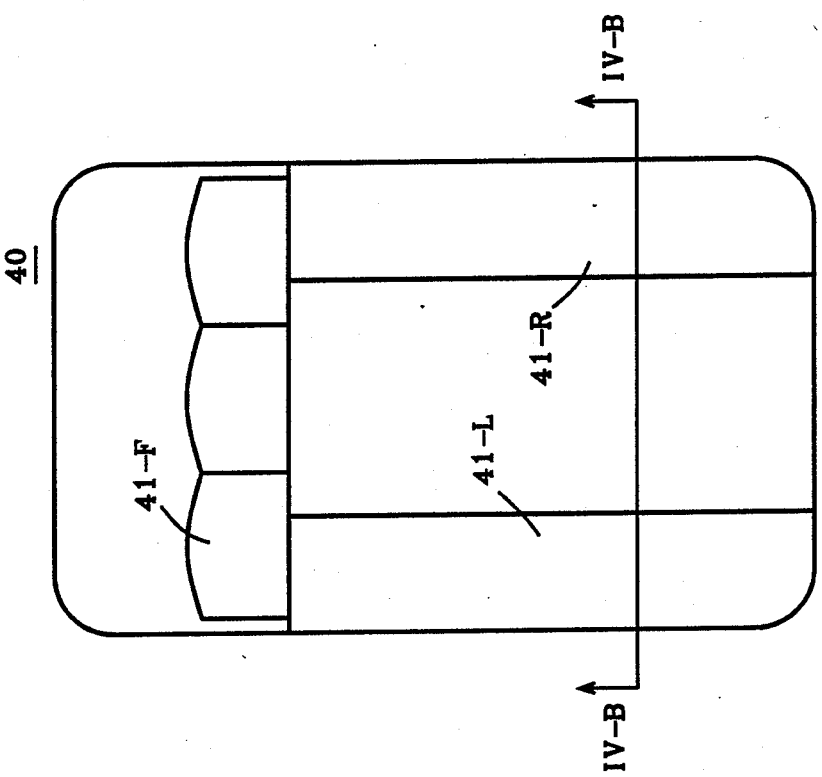

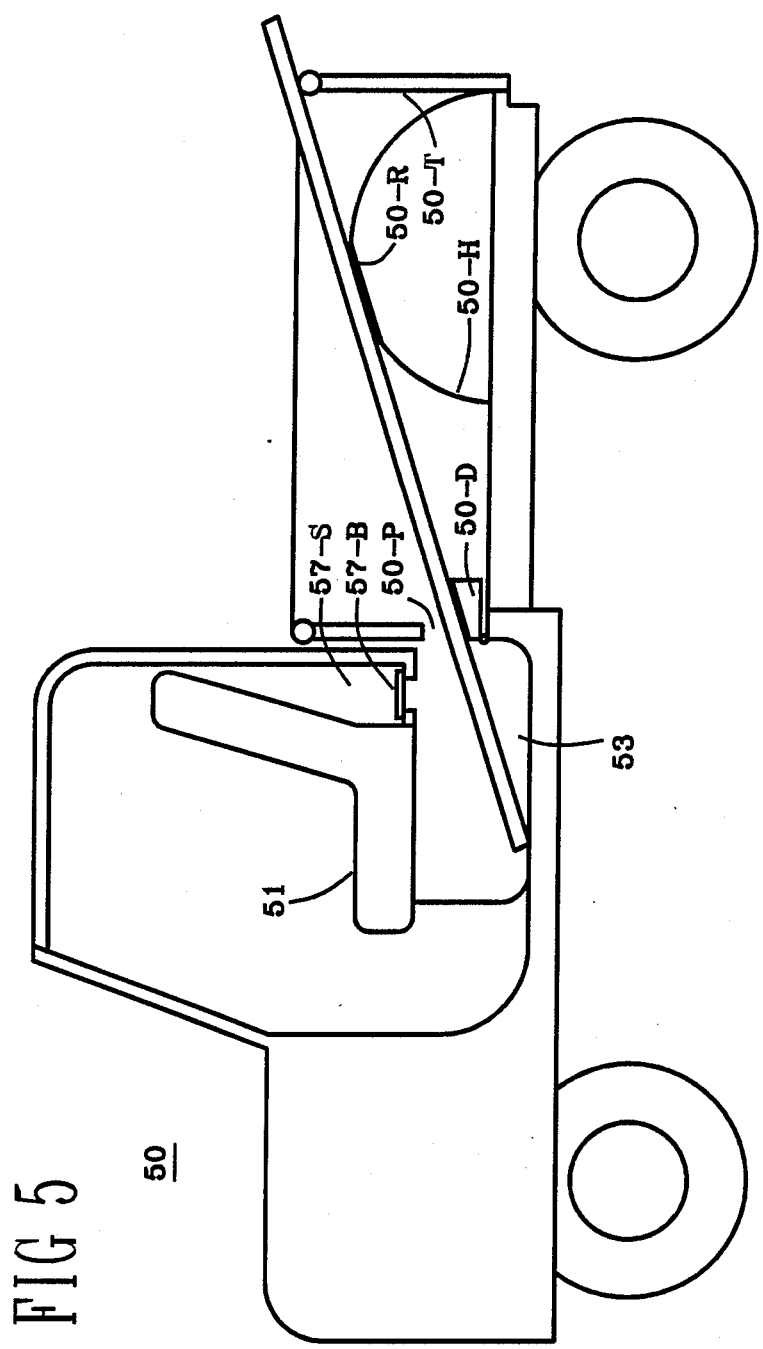

UNDERSEAT EXPANSION BED VEHICLE FOR TRANSPORTING LONG LOAD MATERIAL

TECHNICAL FIELD

This invention relates to load vehicles, and more particularly to such vehicles in which the bed expands forward into the region under the seat for transporting long load material.

BACKGROUND

The conventional standard eight foot bed pick-up trucks can accommodate 4×8 panel sheets. However these trucks are long and require more garage room and parking space than smaller vans and trucks. These standard bed trucks are also heavier and have a lower miles-per-gallon fuel rating.

Short bed pick-up trucks are lighter; but can not accommodate an eight foot panel without the load sticking out the tailgate. Red warning flags are required to alert other drivers to the extended load danger. The overhang load sometimes blocks the rear tail lights, braking lamps and direction indicators creating additional hazards. Further, with the tailgate down the panel loads sometimes slide out on upgrades or during acceleration.

Sturdy overhead racks permit the panel loads to extend over the cab rather than out the tailgate. However, the weight of the rack alone raises the center of gravity of the vehicle. With addition of a heavy panel load, this overhead configuration causes stability problems. Fuel economy is reduced due to drag along the leading edge of the rack and the load. The mere weight of the rack as a permanent fixture on the truck reduces the mileage.

German Pat. No. 1,092,312 issued Feb. 10, 1980 shows a commercial truck with a load bed extending into the cab area between the seats. The center front seat has been removed. The extended load area can not accommodate panel type material.

Austrian Pat. No. 235,163 issued Dec. 27, 1962 shows a passenger vehicle with a long ski rack extending from the trunk into the area above the back seat. The center rear passenger space is displaced by the protruding load.

SUMMARY

It is therefore an object of this invention to provide an expansion bed vehicle for long loads especially panel sheet type loads.

It is another object of this invention to provide such an expansion bed vehicle for long loads which is lighter and more fuel efficient.

It is a further object of this invention to provide such an expansion bed vehicle which shorter and requires less parking space and garage room.

It is a further object of this invention to provide such an expansion bed vehicle which is safer.

It is a further object of this invention to provide such an expansion bed vehicle in which the load is contained within the boundaries of the vehicle.

It is a further object of this invention to provide such an expansion bed vehicle with a low center of gravity.

It is a further object of this invention to provide such an expansion bed vehicle which can accommodate long loads without displacing seating space, foot space, or occupying significant usable space.

It is a further object of this invention to provide such a expansion bed vehicle in which the load is concealed.

It is a further object of this invention to provide such an expansion bed vehicle in which the load is secure.

Briefly, these and other objects of the present invention are accomplished by providing a vehicle for personnel and load material. The vehicle has a personnel section in the front of the vehicle with seats and foot space for the personnel; and a load section in the back of the vehicle for receiving the load material. An initial bed in the load section extends in the front-back direction of the vehicle. An expansion bed extends under the seats for expanding the load capacity of the vehicle in the length dimension beyond the initial bed means. A stop device prevents the load material from entering the personnel foot space.

BRIEF DESCRIPTION OF THE DRAWING

Further objects and advantages of the present bed expansion vehicle and the operation thereof will become apparent from the following detailed description and drawing in which:

FIG. 2A is a side view in section of a cab type truck with bed expansion into the area under the rear seat and front seat;

FIG. 2B is a rear view in section along lines II-B of FIG. 2A showing the side support for the seats;

FIG. 2C is a fragmentary view of the side support structure shown in FIGS. 2A and 2B;

FIG. 3A is a side view in section of a family type minivan showing five stages of bed expansion;

FIG. 3B is a rear view in section along lines III-B of FIG. 3A showing yoke seat supports and slide tracks;

FIG. 3C is a fragmentary view of the slide track structure shown in FIGS. 3A and 3B;

FIG. 4A is a top view in section of a personnel carrier showing bed expansion under the driver's seat;

FIG. 4B is a rear view in section along lines IV-B of FIG. 4A showing side rollers; and FIG. 5 is a side view partially broken away in section of a pick-up truck showing tilt expansion into the area under the driver's seat.

Figure 1:
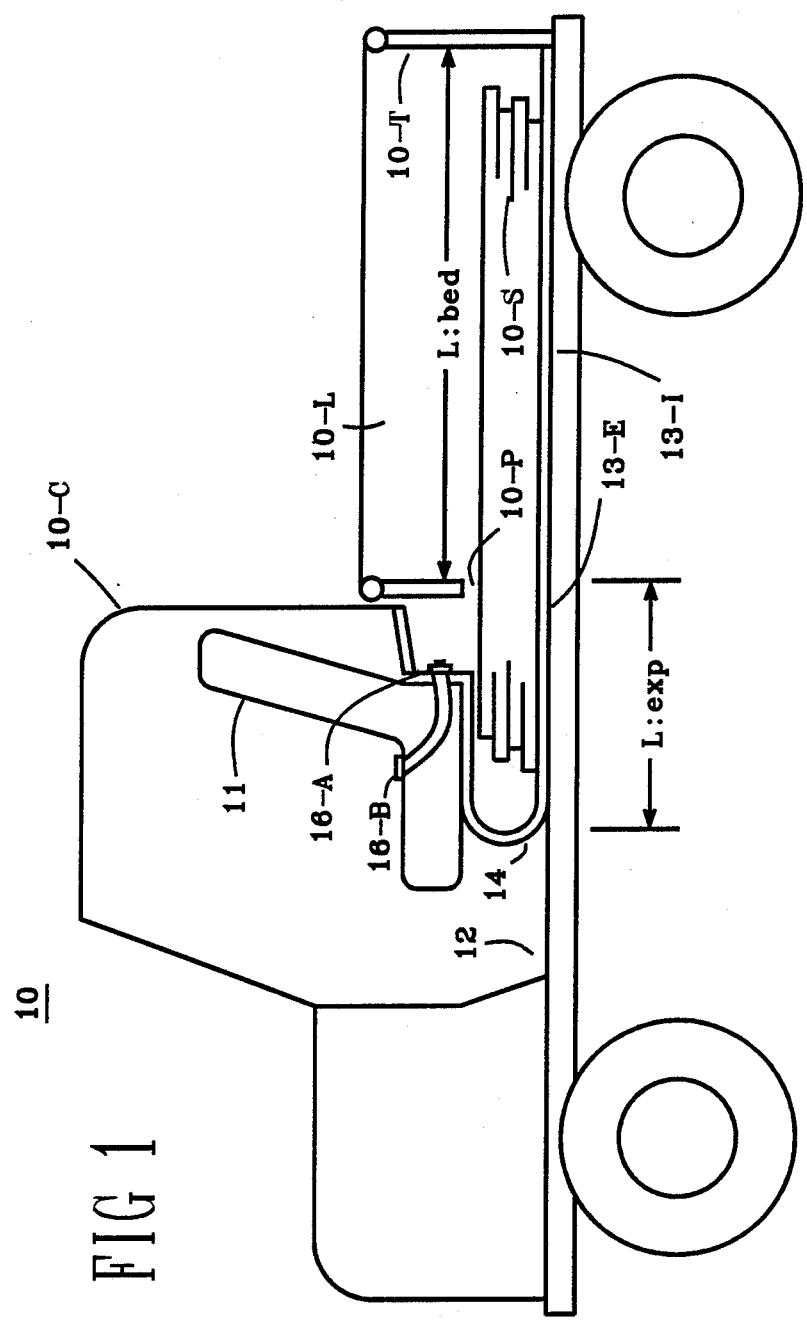
FIG. 1 is a side view in section of a pick-up truck with bed expansion into the area under the driver's seat.

Each element of the invention is designated by a two digit reference numeral. The first digit indicates the Figure in which that element is first disclosed or is primarily described. The second digit indicates like features and structural elements throughout the Figures. Some reference numerals are followed by a letter which indicates a subportion or feature of that element.

GENERAL EMBODIMENT (FIG. 1)

Expansion bed vehicle 10 has a personnel or cab section 10-C with driver's seat 11 and foot space 12 for the driver. Rear load section 10-L of vehicle 10 is formed by initial bed area 13-I at the rear of the vehicle and expansion bed area 13-E extending under seat 11. The initial bed area receives panel type load material such as plywood sheets 10-S which are slid into the expansion bed area.

Initial bed 13-I has a front-back length dimension of L:bed. If the length of the panel load exceeds L:bed, the load may be pushed forward through load port 10-P into expansion bed area 13-E which has an additional front-back dimension of L:exp. The load port is formed along the bottom of the forward wall of the load bed and the adjacent rearward wall of the cab. The expansion bed area permits vehicle 10 to handle long loads which exceed L:bed without extending beyond the tailgate 10-T of the vehicle. A suitable barrier such as load stop 14 under the seat prevents the panel load from sliding into foot space 12 during deceleration.

The space under the driver's seat is normally not used by the occupants. Pushing the sheet load into the underseat space therefore does not interfere with the seating or operation of the vehicle. The underseat space may be accessed from the side when the vehicle door is open as shown in FIG. 1. Seat belt anchors 16-A for seat belts 16-B may be secured to the vehicle frame just above the expansion bed area.

TWO SEAT EMBODIMENT (FIGS. 2A 2B and 2C)

Expansion bed vehicle 20 has a two seat cab section 20-C having back seat 21-B and front seat 21-F. Each seat has an expansion area thereunder. The back seat is over first expansion area 23-1 with a second expansion area 23-2 in the footspace for the back seat passengers. The front seat is over third expansion area 23-3.

Rear load section 20-L has raised rails 25 along each side for receiving a long panel type load such as particle board sheets 20-S. The rails support the load along the edges only to reduce the coefficient of sliding friction. The load may be easily pushed forward through load port 20-P into first expansion bed area 23-1 under the back seat; and if required into second expansion area 23-2 and third expansion area 23-3. The slide rail extends into the expansion bed areas Port cover or door 20-D has a closed or stop position for preventing the load from sliding forward from load section 20-L into cab section 20-C. Port cover 20-D may have a suitable sealing material such as weather stripping 20-W around the edge thereof for sealing port 20-P and protecting the interior of the cab from the elements. The port cover also has an open position or pass position as shown in FIG. 2A, for permitting the panel load on rails 25 to enter the expansion areas.

First load barrier 24-1 mounted under the backseat provides a load stop for first expansion area 23-1 under the seat. Barrier 24-1 is removable for permitting the load to pass forward into second expansion area 23-2 in front of the seat. Barrier 24-1 is set back slightly from the front edge of the backseat to leave a heel space for the back seat passenger.

In like manner second barrier 24-2 is removable to provide stop and pass functions for second expansion area 23-2. Front or third barrier 24-3 is fixed for retaining the load in third expansion area 23-3 and preventing the load from passing into driver's foot space 22-F.

The seats are securely mounted within the cab by left and right side supports 26-L and 26-R (see FIG. 2C) extending upward from vehicle main frame 20-F. The seats are free from contact with the floor or frame across the width thereof to form an expansion channel which must be wide enough to accommodate the width dimension of the panel load extending from side to side within the channel.

FAMILY VAN EMBODIMENT (FIGS. 3A 3B and 3C)

Expansion bed van 30 has a three seat housing section 30-C having back seat 31-B mounted on back support yoke 36-B, middle seat 31-M mounted on middle support yoke 36-M and front seat 31-F mounted on front support yoke 36-F. Each seat has an expansion bed area thereunder—back seat area 33-1, middle seat area 33-3, and front seat area 33-5. The foot areas for the middle seat and back seat provide two foot expansion areas—back area 33-2 and middle area 33-4. The load expansion channel for van 30 extends from rear load door 30-D to the forward area under the driver's seat.

Each of the five expansion areas has a barrier at the forward end thereof - back seat barrier 34-1, back foot barrier 34-2, middle seat barrier 34-3, middle foot barrier 34-4, and front seat barrier 34-5, for preventing the load from entering the next expansion area. All of the barriers except for front seat barrier 34-5 are moveable from the stop position to an pass position to permit the load to pass into the next expansion area. Front seat barrier 34-5 which is fixed to prevent the load from entering the drivers foot space.

Preferably the barriers are hinge mounted along the top and swing upwards from a generally vertical stop position blocking the expansion channel into a generally horizontal pass position in the clear above the expansion channel. Back seat barrier 34-1 and middle seat barrier 34-3 swing rearward as shown in FIG. 3A into an out-of-the-way pass position under the seats. Back foot barrier 34-2 and middle foot barrier 34-4 swing forward as shown in FIG. 3A into an out-of-the-way pass position.

Support yokes 36 have a lower span securely fastened to frame 30-F and an upper span securely fastened to the seat thereover. The left and right ends of each yoke define the width limits of the expansion channel. Seat belt anchors 36-A may be provided along the upper span to facilitate seat belts for each passenger.

Panel type loads are inserted into back expansion bed area 33-1 through rear loading port 30-P when rear door 30-D is open. Low friction slide tracks 35-T with beveled ends are provided along the floor of the vehicle extending in the front-back direction to assist in pushing the load into the expansion areas. The slide tracks is slip over flanged anchor strips 35-A which are secured to the bed. A section of slide track is mounted to the floor behind each yoke. Preferable the slide tracks are spaced across the width of the expansion channel to support the load along the left and right edges and along the middle. The top surface of each slide track preferably has a curved traverse cross section (see FIG. 3C) to permit only a tangent line of low friction material to engage the bottom surface of the load. The top of the curve is preferably sufficiently high to clear the lower span of the support yokes.

The load panel is shown partially withdrawn from the vehicle to serve as a small "tail gate" table or work space.

PERSONNEL CARRIER EMBODIMENT (FIGS. 4A and 4B)

Expansion bed personnel carrier 40 has a driver's seat 41-F with an expansion bed area thereunder. Personnel seats 41-R and 41-L are mounted along the sides of the carrier over load bed 40-L. A set of side rollers 45-R and 45-L are mounted under the personnel seats near the left and right side walls to permit load 40-S to be easily moved forward into the vehicle. The thin space under the panel load is available for wood planks 40-W, long pipes 40-PP and other items. Additional items may be in load bed 40-L on top of the panel load.

Rollers 45 prevent scuffing of the underside of the panel load during loading. The underside of the load is not exposed and is protected from other load items and passengers.

TILT LOAD EMBODIMENT (FIG. 5)

Short bed vehicle 50 has expansion bed area 53 under driver's 51 seat with the panel load extending at a tilt toward the rear of the vehicle. The front of the load is supported by the floor in the expansion area. The rear of the load is supported by tail gate 50-T of the vehicle. The rear middle of the load is preferably supported by the rear wheel housings 50-H. A generally planar surface is provided on each wheel housing for engaging the load. Resilient pad 50-R may be mounted on the planar surface to protect the load. The forward middle of the load may be supported at port 50-P by wedge shaped door 50-D which swings into the bed area to provide an inclined support surface.

Expansion area 53 may be accessed through side ports when either door of the vehicle is open as shown in FIG. 5. A movable false bottom 57-B is provided in storage space 57-S behind driver's seat 51. Expansion bed area 53 may serve as a bottom extension to storage space 57-S

SPECIFIC EMBODIMENT

The following particulars of van expansion bed vehicle 10 are given as an illustrative example of the expansion channel. In this example:

Initial Bed Area
    length 72" (183 cm)
    width 48" (122 cm)
Expansion Bed Area
    length 24" (61 cm)
    width 48" (122 cm)
Port height
    width 5½" (14 cm)
Slide Track —low friction polymer material ⅛" (0.32 cm) thick extending about ¼"(0.64 cm) above the bed and secured to the bed by an aluminum anchor with side flanges.

The dimensions and materials given above are not intended as defining the limitations of the invention. Numerous other applications and configurations are possible.

INDUSTRIAL APPLICABILITY

It will be apparent to those skilled in the art that the objects of this invention have been achieved as described hereinbefore by providing an expansion bed vehicle for long loads especially panel sheet type loads. The vehicle bed has an initial bed area and an expansion bed area which together form a long bed. The leading edge of the load is contained within the expansion bed area and does not generate air drag as the vehicle is moving. The vehicle does not require external racks or supports which add to the weight of the vehicle. The reduced air drag and reduced weight combine to provide increased fuel efficiency. The expansion bed extends under the seat to reduce the length of the initial bed and overall length of the vehicle. The resulting shorter vehicle requires less parking space and garage room. The load is safely contained within the vehicle in the lower portion of the vehicle. The combination of the vehicle and the load produce a low center of gravity. The expansion bed area under the seat does not displace significant usable space within the personnel portion.

CONCLUSION

Clearly various changes may be made in the structure and embodiments shown herein without departing from the concept of the invention. Further, features of the embodiments shown in the various Figures may be employed with the embodiments of the other Figures. Therefore, the scope of the invention is to be determined by the terminology of the following claims and the legal equivalents thereof.

I claim as my invention:

1. A vehicle for personnel and load material, comprising:
   personnel section in the front of the vehicle;
   a front seating means within the personnel section having a front foot space;
   a back seating means within the personnel section having a back foot space;
   load section in the back of the vehicle for receiving the load material;
   initial bed area in the load section having a length dimension extending in the front-back direction of the vehicle and a width dimension extending in the side-side direction;
   a back expansion bed area under the back seating means for expanding the load capacity of the vehicle in the length dimension beyond the initial bed area;
   a foot expansion area formed by the foot space for the personnel of the back seating means;
   back stop means for preventing the load material from extending beyond the back expansion area, and which is movable for further expanding the load capacity of the vehicle in the length dimension beyond the initial bed area and the back expansion area to include the foot expansion area by permitting the load material to enter the foot expansion area; and
   foot stop means for preventing the expansion bed area from extending beyond the foot expansion area.

2. The vehicle for personnel and load material of claim 1, wherein the seating means comprises at least a driver seating means within the personnel section of the vehicle.

3. The vehicle for personnel and load material of claim 2, further comprising a side support means for supporting the back seating means over the back expansion bed area.

4. The vehicle for personnel and load material of claim 2, further comprising a yoke support means for supporting the back seating means over the back expansion bed area.

5. The vehicle for personnel and load material of claim 1, further comprising:
   a front expansion area formed by the space under the front seating means.

6. The vehicle for personnel and load material of claim 5, further comprising:
   front stop means for preventing the load material from entering the foot space for the front seating means.

7. The vehicle for personnel and load material of claim 1, further comprising:
   foot stop means for preventing the expansion area from extending beyond the foot expansion area, and which is movable for expanding the load capacity of the vehicle in the length dimension beyond the initial bed area plus the back expansion area plus the foot expansion area to include the front expansion area by permitting the load material to enter the front expansion area; and front stop means for preventing the load material from entering foot space for the front seating means.

8. The vehicle for personnel and load material of claim 1, wherein the bed area further comprises rail means to facilitate moving the load material into and out of the vehicle and for supporting the load material while in the vehicle.

9. The vehicle for personnel and load material of claim 8, wherein the rail means further comprises side rails along each side of the bed area for moving and supporting wide load material.

10. The vehicle for personnel and load material of claim 9, wherein the wide load material extends from one side rail to the other side rail defining a thin space thereunder.

11. The vehicle for personnel and load material of claim 8, wherein the rails means are sliding rail means for further facilitating the moving of the load material by sliding.

12. The vehicle for personnel and load material of claim 8, wherein the rails means are roller rail means for further facilitating the moving of the load material by roller.

13. The vehicle for personnel and load material of claim 1 further comprising:

housing means enclosing the personnel section and the load section;

door means in the rear of the housing means having an open position and a closed position, for providing access to the initial bed area in the load section when in the open position.

14. The vehicle for personnel and load material of claim 13, further comprising:

middle seating means between the back seating means and the front seating means having a middle expansion area thereunder.

15. The vehicle for personnel and load material of claim 13, further comprising:

front seating means in the front of the housing having a front expansion area thereunder;

rear left seating means in the rear of the housing having a rear left expansion area thereunder; and rear right seating means in the rear of the housing having a rear right expansion area thereunder.

16. A vehicle for personnel and load material, comprising:

personnel section in the front of the vehicle having seating means and foot space for the personnel;

load section in the back of the vehicle for receiving the load material;

initial bed means in the load section having a length dimension extending in the front-back direction of the vehicle and a width dimension extending in the side-side direction;

cab means enclosing the personnel section containing the seating means and personnel foot space;

rear wall means formed in the cab means between the load section and the cab means;

expansion bed means under the seating means for expanding the load capacity of the vehicle in the length dimension beyond the initial bed means;

port means in the rear wall means for providing communication between the exterior initial bed means and the expansion bed means under the seating means;

port cover means having a closed position blocking the port means and an open position clear of the port means for expanding the load capacity of the vehicle to include the expansion bed means; and stop means for preventing the load material from entering the personnel foot space.

17. The vehicle for personnel and load material of claim 16, further comprising a storage space within the cab means between the rear wall means and the seating means above the expansion bed means.

18. The vehicle for personnel and load material of claim 17, further comprising a false bottom within the storage space which when removed provides communication between the storage space and the expansion bed means.

19. The vehicle for personnel and load material of claim 16, further comprising a lock means on the port cover means for securing the port means when in the closed position.

20. A vehicle for personnel and load material, comprising:

personnel section in the front of the vehicle having seating means and foot space for the personnel;

load section in the back of the vehicle for receiving the load material;

initial bed means in the load section having a length dimension extending in the front-back direction of the vehicle and a width dimension extending in the side-side direction;

cab means enclosing the personnel section containing the seating means and foot space;

rear wall means formed in the cab means between the load section and the cab means;

expansion bed means under the sealing means for expanding the load capacity of the vehicle in the length dimension beyond the initial bed means;

port means in the rear wall means for providing communication between the initial bed means and the expansion bed means under the seating means;

the expansion bed means lower than the initial bed means for permitting the load material to be installed at a tilt with the front end of the load material lower than the back end; and stop means for preventing the load material from entering the personnel foot space.

21. The vehicle for personnel and load material of claim 20, further comprising pad means in the load section of the vehicle for supporting the back end of the load material in a position higher than the front end of the load material.

22. The vehicle for personnel and load material of claim 20, further comprising tail gate means positioned in the rear of the load section for supporting the back end of the load material in a position higher than the front end of the load material.

23. The vehicle for personnel and load material of claim 20, further comprising wheel housing positioned in the rear of the load section for supporting the back end of the load material in a position higher than the front end of the load material.

* * * * *